(12) United States Patent
Chen et al.

(10) Patent No.: US 12,277,454 B2
(45) Date of Patent: Apr. 15, 2025

(54) METHOD, DEVICE, AND COMPUTER PROGRAM PRODUCT FOR MANAGING STORAGE SYSTEM

(71) Applicant: EMC IP Holding Company LLC, Hopkinton, MA (US)

(72) Inventors: Tao Chen, Beijing (CN); Bing Liu, Tianjin (CN); Lingdong Weng, Beijing (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 362 days.

(21) Appl. No.: 17/460,952

(22) Filed: Aug. 30, 2021

(65) Prior Publication Data

US 2023/0036615 A1 Feb. 2, 2023

(30) Foreign Application Priority Data

Jul. 23, 2021 (CN) .......................... 202110837081.0

(51) Int. Cl.
*G06F 9/46* (2006.01)
*G06F 3/06* (2006.01)
*G06F 9/48* (2006.01)
*G06F 9/50* (2006.01)

(52) U.S. Cl.
CPC .......... *G06F 9/5088* (2013.01); *G06F 3/0676* (2013.01); *G06F 3/0679* (2013.01); *G06F 9/4881* (2013.01); *G06F 9/505* (2013.01); *G06F 2209/501* (2013.01); *G06F 2209/5019* (2013.01); *G06F 2209/5022* (2013.01)

(58) Field of Classification Search
CPC ...... G06F 9/5088; G06F 9/4881; G06F 9/505; G06F 2209/501; G06F 2209/5019; G06F 2209/5022
See application file for complete search history.

(56) References Cited

U.S. PATENT DOCUMENTS

| | | | |
|---|---|---|---|
| 2012/0239904 A1* | 9/2012 | Ekanadham | G06F 9/3851 |
| | | | 712/E9.016 |
| 2020/0210827 A1* | 7/2020 | Yang | G06F 9/5066 |
| 2021/0011764 A1* | 1/2021 | Kelly | G06F 9/505 |
| 2021/0124612 A1* | 4/2021 | Ramakrishnan | G06F 9/4887 |

* cited by examiner

*Primary Examiner* — Diem K Cao
(74) *Attorney, Agent, or Firm* — WOMBLE BOND DICKINSON (US) LLP (57) ABSTRACT

Embodiments of the present disclosure relate to a method, an electronic device, and a computer program product for managing a storage system. The method includes: based on respective task types of a plurality of tasks to be executed, allocating the plurality of tasks to a plurality of accelerator resources in a storage system for processing; at least for a first accelerator resource in the plurality of accelerator resources, determining a first polling interval based on an average task size of a first group of tasks allocated to the first accelerator resource; and scheduling the execution of the first group of tasks at the first accelerator resource at the first polling interval. The embodiments of the present disclosure can optimize the scheduling of the tasks to be executed on the plurality of accelerator resources, thereby optimizing system performance.

20 Claims, 7 Drawing Sheets

T=180 microseconds

METHOD, DEVICE, AND COMPUTER PROGRAM PRODUCT FOR MANAGING STORAGE SYSTEM

CROSS-REFERENCE TO RELATED APPLICATION

This patent application claims priority, under 35 U.S.C. § 119, of Chinese Patent Application No. 202110837081.0, filed Jul. 23, 2021, which is incorporated by reference in its entirety.

TECHNICAL FIELD

Embodiments of the present disclosure generally relate to the field of data storage, and in particular, to a method, a device, and a computer program product for managing a storage system.

BACKGROUND

Accelerator resources (such as co-processors) are often used in storage systems to assist a central processing unit (CPU) in performing some acceleration tasks. For example, Quick Assist Technology (QAT) cards are a type of common co-processors that can be used to accelerate computationally intensive tasks, such as compression, encryption, and decryption. The storage systems often include a plurality of accelerator resources, such as the QAT cards. There are often a large number of tasks of different task types that need to be processed with the accelerator resources. How to better allocate the tasks of various task types to the plurality of accelerator resources is a concern.

SUMMARY OF THE INVENTION

A method, a device, and a computer program product for managing a storage system are provided in embodiments of the present disclosure.

In a first aspect of the present disclosure, a method for managing a storage system is provided. The method includes: based on respective task types of a plurality of tasks to be executed, allocating the plurality of tasks to a plurality of accelerator resources in a storage system for processing; at least for a first accelerator resource in the plurality of accelerator resources, determining a first polling interval based on an average task size of a first group of tasks allocated to the first accelerator resource; and scheduling the execution of the first group of tasks at the first accelerator resource at the first polling interval.

In a second aspect of the present disclosure, an electronic device is provided. The electronic device includes at least one processing unit and at least one memory. The at least one memory is coupled to the at least one processing unit and stores instructions for execution by the at least one processing unit. The instructions, when executed by the at least one processing unit, cause the electronic device to perform actions, the actions including based on respective task types of a plurality of tasks to be executed, allocating the plurality of tasks to a plurality of accelerator resources in a storage system for processing; at least for a first accelerator resource in the plurality of accelerator resources, determining a first polling interval based on an average task size of a first group of tasks allocated to the first accelerator resource; and scheduling the execution of the first group of tasks at the first accelerator resource at the first polling interval.

In a third aspect of the present disclosure, a computer program product is provided. The computer program product is tangibly stored in a non-transitory computer storage medium and includes machine-executable instructions. The machine-executable instructions, when executed by a device, cause the device to execute any step of the method according to the first aspect of the present disclosure.

The Summary of the Invention part is provided to introduce the selection of concepts in a simplified form, which will be further described in the Detailed Description below. The Summary of the Invention part is neither intended to identify key features or essential features of the present disclosure, nor intended to limit the scope of the present disclosure.

BRIEF DESCRIPTION OF THE DRAWINGS

The above and other objectives, features, and advantages of the present disclosure will become more apparent by describing example embodiments of the present disclosure in further detail with reference to the accompanying drawings, and in the example embodiments of the present disclosure, the same reference numerals generally represent the same components.

Identical or corresponding numerals represent identical or corresponding parts in various accompanying drawings.

DETAILED DESCRIPTION

Preferred embodiments of the present disclosure will be described in more detail below with reference to the accompanying drawings. Although preferred embodiments of the present disclosure are illustrated in the accompanying drawings, it should be understood that the present disclosure may be implemented in various forms and should not be limited by the embodiments illustrated herein. Rather, these embodiments are provided to make the present disclosure more thorough and complete and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "one example embodiment" and "one embodiment" mean "at least one example embodiment." The term "another embodiment" indicates "at least one additional embodiment." The terms "first," "second," and the like may refer to different or identical objects. Other explicit and implicit definitions may also be included below.

Figure 1:
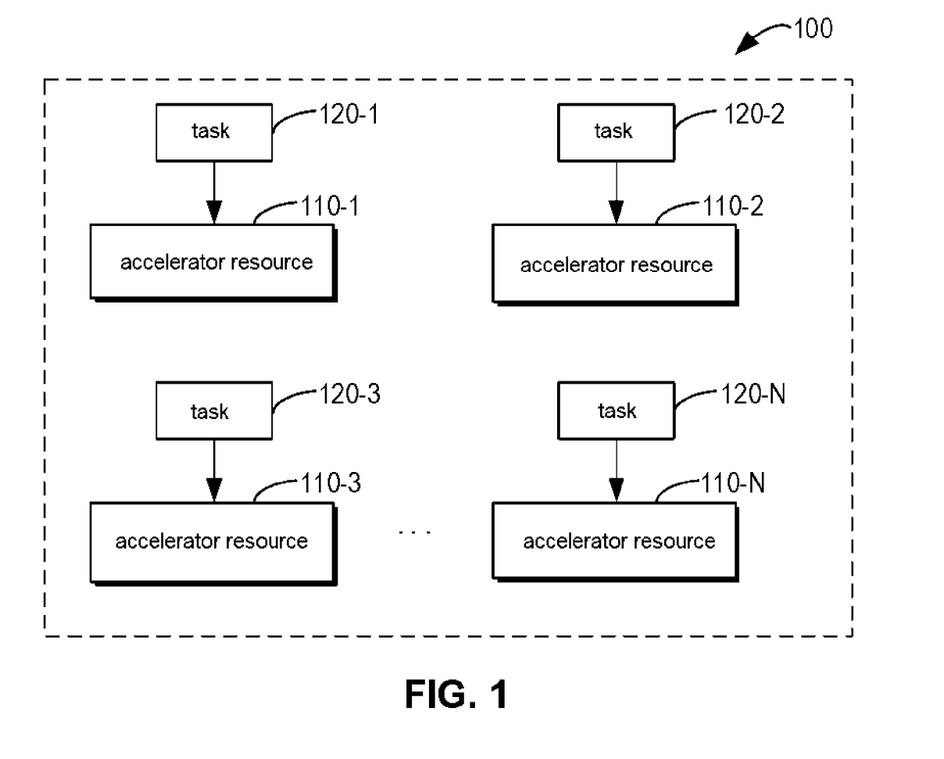
FIG. 1 illustrates a schematic diagram of an example system in which some embodiments of the present disclosure can be implemented.

FIG. 1 illustrates a schematic diagram of a storage system 100 in which embodiments of the present disclosure may be implemented. The storage system 100 is used to provide tasks related to data storage, including, for example, storage, data access, and data protection (such as deduplication, backup, encryption, and decryption). It should be understood that the system illustrated in FIG. 1 is only an example. In practical applications, more other devices and/or components in devices may exist in the storage system, or the illustrated devices and/or components may be arranged in other manners.

As shown in FIG. 1, the storage system 100 includes a plurality of (such as N) accelerator resources 110-1, 110-2, 110-3, . . . , 110-N, wherein N is an integer greater than 1. For ease of discussion, the accelerator resources 110-1, 110-2, 110-3, . . . , 110-N are sometimes referred to, collectively or individually, as an accelerator resource 110 hereinafter. Each accelerator resource 110 is configured to execute various tasks 120-1, 120-2, 120-3, . . . , 120-N (collectively or individually referred to as a task 120) of the storage system 100. Herein, the tasks are also referred to as jobs, requests, or instances.

The accelerator resource 110 may be located on a node (not shown) of the storage system 100, and the node may be implemented by one or more computing devices, computing systems, servers, mainframes, edge devices, etc. Herein, the nodes are also referred to as devices. In some embodiments, each node of the storage system 100 is respectively provided with one or more accelerator resources 110. Every node of the storage system 100 may be deployed with the same or different accelerator resources 110 for executing corresponding tasks.

In the storage system 100, tasks to be executed at the accelerator resource 110 include various types of tasks related to data storage. As some examples, the tasks may include compression tasks used for compression of user data; encryption tasks used for encryption of user data; and encryption tasks (such as SHA tasks) used for decryption of user data. Of course, these are just some specific examples. There may be other types of tasks in the storage system 100, such as data backup tasks and data recovery tasks.

The use of the accelerator resource 110 may accelerate the processing of various tasks, so as to improve the overall throughput of the storage system 100. In some embodiments, the accelerator resource 110 may be one or more QAT cards. It should be understood that although the QAT cards are used as an example of the accelerator resources in some embodiments of the present disclosure, the accelerator resource 110 may also include other hardware processing devices having an acceleration function.

Depending on the storage system used, in some embodiments, the storage system 100 may include two accelerator resources (i.e., N=2) 110. In some embodiments, the storage system 100 may include a scalable multi-node (multi-device) system that includes at least two (i.e., N≥2) accelerator resources 110. In such system, tasks may be scheduled to each accelerator resource 110 for execution. It should be understood that the number of nodes of the storage system 100 may be arbitrary, and the number of the accelerator resources 110 on each node may be arbitrary.

It should be understood that the storage system 100 shown in FIG. 1 is merely an example and not limiting. The storage system according to the present disclosure may also have other forms or structures.

Figure 2:
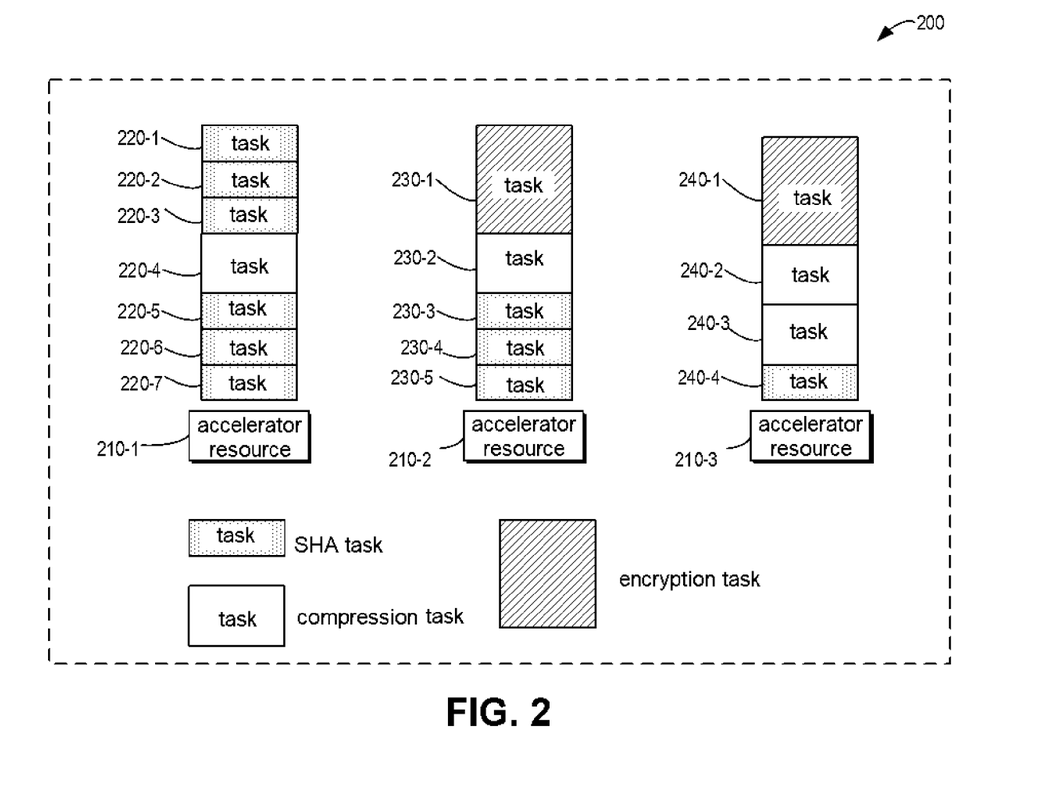
FIG. 2 illustrates a schematic diagram of allocating tasks to a plurality of accelerator resources.

FIG. 2 illustrates a conventional solution of allocating a plurality of tasks in a storage system 200 to a plurality of accelerator resources. As shown in FIG. 2, the storage system 200 includes accelerator resources 210-1, 210-2, and 210-3 (collectively or individually referred to as an accelerator resource 210). In the conventional solution, various tasks are allocated to a plurality of accelerator resources, typically by balancing task sizes of the to-be-processed tasks at different accelerator resources. As shown in FIG. 2, the tasks 220-1, 220-2, 220-3, 220-5, 220-6, and 220-7 of an SHA task type, and the task 220-4 of a compression task type are allocated to the accelerator resource 210-1. The task 230-1 of an encryption task type, the task 230-2 of the compression task type, and the tasks 230-3, 230-4 and 230-5 of the SHA task type are allocated to the accelerator resource 210-2. The task 240-1 of the encryption task type, the tasks 240-2 and 240-3 of the compression task type, and the task 240-4 of the SHA task type are allocated to the accelerator resource 210-3. The total task size of the to-be-processed tasks at each accelerator resource 210 is substantially the same.

Traditionally, a polling mode is typically used to schedule tasks to be executed on accelerator resources. For example, at a polling interval, whether a current task on an accelerator resource is completed or not is determined. However, in a conventional solution, it is difficult to determine an appropriate polling interval when tasks to be executed on the accelerator resource belong to different task types. Taking the accelerator resource 210-1 shown in FIG. 2 as an example, execution time required by the accelerator resource 210-1 for tasks of the SHA type is typically 17 microseconds (when the task size is 8 KB), but execution time required for tasks of the compression type is about 280 microseconds (when the task size is 100 KB). In this case, it is difficult to determine an appropriate polling interval.

A common selection method is to select the polling interval close to the shorter required execution time, for example, to select 20 microseconds close to the 17 microseconds in the above example. Such short polling interval may cause a plurality of unnecessary polls for uncompleted compression tasks, thereby increasing context switch expenses of the compression tasks. Another common selection method is to select the polling interval close to the longer required execution time, for example, to select 300 microseconds close to the 280 microseconds in the above example. Such long polling interval may increase the latency of the SHA tasks, and the SHA tasks need to wait more time to be polled. Therefore, for a plurality of tasks of different types, it is difficult to reasonably allocate the tasks to a plurality of accelerator resources and to ensure that an appropriate polling interval is set for each accelerator resource.

An embodiment of the present disclosure proposes a solution for managing a storage system to solve one or more of the above problems and other potential problems. In the solution, based on task types of tasks to be executed, the tasks are allocated to a plurality of accelerator resources for processing. The solution further includes determining a polling interval for scheduling a group of allocated tasks at each accelerator resource based on an average task size of the group of tasks allocated to the accelerator resource.

In this way, reasonable allocation of the tasks may be achieved by allocating the tasks to be executed to different accelerator resources according to the task types. Therefore, tasks allocated to each accelerator resource are of the same task type, so that the tasks have similar required execution time, thereby facilitating determination of an appropriate polling interval.

The fundamental principles and several example embodiments of the present disclosure will be described in detail below with reference to the accompanying drawings.

A flow chart of a method 300 for allocating a plurality of tasks to a plurality of accelerator resources according to some embodiments of the present disclosure will be described below with reference to FIG. 3. The method 300 may be implemented by a device or node of the storage system 100. It should be understood that the method 300 may also be performed by other suitable devices or apparatuses. The method 300 may include additional actions not shown and/or may omit actions shown, and the scope of the present disclosure is not limited in this regard. For ease of description, the method 300 will be described with reference to FIG. 1.

Figure 3:
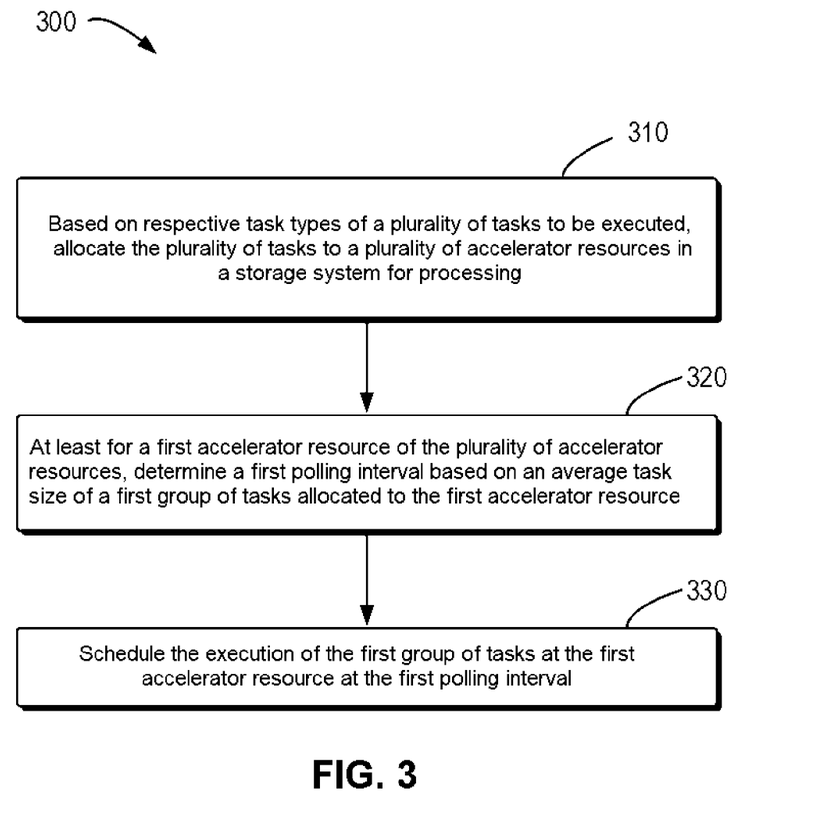
FIG. 3 illustrates a flow chart of an example method for managing a storage system according to some embodiments of the present disclosure.

As shown in FIG. 3, at 310, based on respective task types of the plurality of tasks to be executed, the plurality of tasks are allocated to the plurality of accelerator resources 110 in the storage system 100 for processing. For example, tasks belonging to a first task type may be allocated to the accelerator resource 110-1 in the plurality of accelerator resources 110. Tasks belonging to a second task type may be allocated to the accelerator resource 110-2. It should be understood that the tasks belonging to the first task type may be allocated to one accelerator resource 110-2 in the storage system 100, or may be allocated to two or more accelerator resources 110 in the storage system 100. The "first" and "second" used here are only for convenience of distinction.

Figure 4:
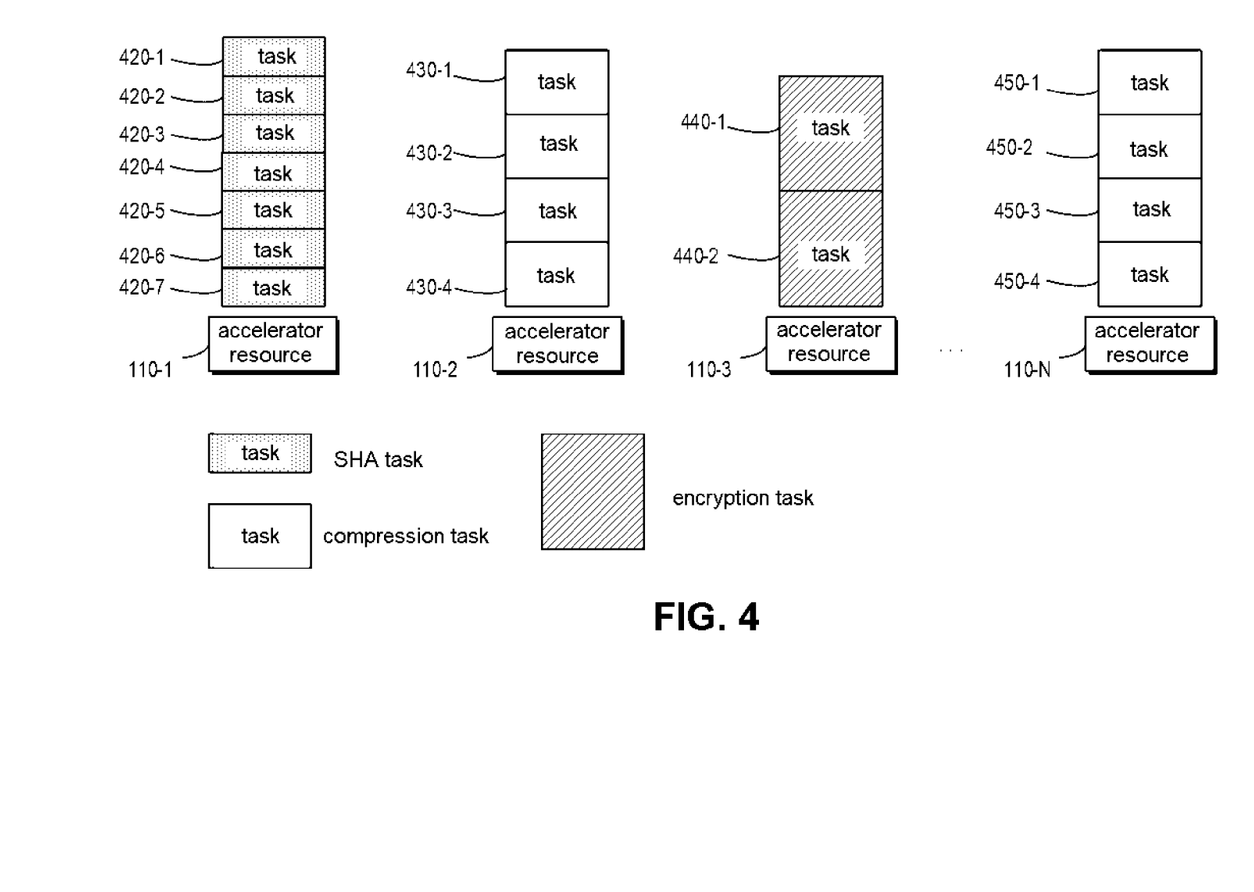
FIG. 4 illustrates a schematic diagram of task allocation according to some embodiments of the present disclosure.

FIG. 4 illustrates a schematic diagram of task allocation according to some embodiments of the present disclosure. As shown in FIG. 4, tasks 420-1, 420-2, 420-3, 420-4, 420-5, 420-6, and 420-7 belonging to the SHA task type are allocated to the accelerator resource 110-1. Tasks 440-1 and 440-2 belonging to the encryption task type are allocated to the accelerator resource 110-3. Tasks 430-1, 430-2, 430-3 and 430-4 belonging to the compression task type are allocated to the accelerator resource 110-2. Tasks 450-1, 450-2, 450-3 and 450-4 belonging to the compression task type are allocated to the accelerator resource 110-N. It should be understood that the storage system 100 may further include other task types besides the several task types shown in FIG. 4. Example allocation in FIG. 4 is merely illustrative and not limiting. The size of a box of each task type shown in FIG. 4 does not mean the corresponding task size.

In such a manner, tasks of different task types can be allocated to different accelerator resources 110. Execution time required for tasks of different task types often varies widely. Therefore, it is convenient to determine the polling interval for each accelerator resource 110 according to the task type of the tasks allocated to the accelerator resource.

Additionally or alternatively, in some embodiments, for a group of tasks belonging to the same type in the plurality of tasks, the group of tasks may be allocated based on the execution time required for the group of tasks. For example, the execution time required for each task in the group of tasks may be determined according to the task size of each task. Taking the group of tasks belonging to the compression task type as an example, when the task size is small, the required execution time is generally short, and when the task size is large, the required execution time is generally long.

Figure 5:
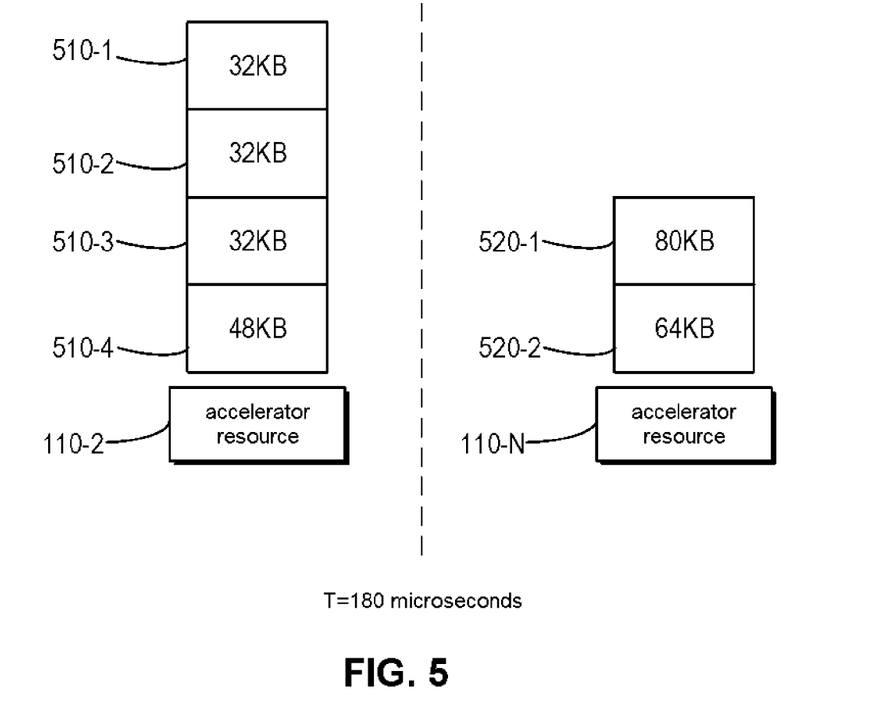
FIG. 5 illustrates another schematic diagram of task allocation according to some embodiments of the present disclosure.

FIG. 5 illustrates a schematic diagram of allocating tasks based on execution time required for the tasks according to some embodiments of the present disclosure. In some embodiments, an association between the execution time required for each task in the group of tasks belonging to a certain task type, for example, the compression task type, and the task size is pre-stored in a lookup table. The look-up table may be derived from historical execution information of the storage system 100, or may be derived from data of a plurality of experiments. In some embodiments, the lookup table may also be provided by a producer of the accelerator resource 110.

Threshold execution time T can be determined according to the task size of each task in the group of tasks and the corresponding required execution time. In accordance with the threshold execution time T, the group of tasks may be allocated to two accelerator resources of the plurality of accelerator resources 110 to ensure that the task sizes of the two accelerator resources are substantially balanced. It should be understood that in some embodiments, more than one threshold execution time may also be determined to allocate the group of tasks to more than two accelerator resources.

FIG. 5 illustrates a schematic diagram of allocating a group of tasks according to respective task sizes of the tasks in accordance with some embodiments of the present disclosure. In the example of FIG. 5, taking the compression task as an example, a group of compression tasks includes tasks 510-1, 510-2, and 510-3 having a task size of 32 KB, a task 510-4 having a task size of 48 KB, a task 520-1 having a task size of 80 KB, and a task 520-1 having a task size of 64 KB. Hereinafter, the tasks 510-1, 510-2, 510-3, and 510-4 are sometimes referred to collectively or individually as a task 510 for ease of discussion. The tasks 520-1 and 520-2 are sometimes collectively or individually referred to as a task 520.

According to the lookup table for querying the association between task sizes and execution time, the execution time required for a task having the task size of 32 KB is about 109 microseconds, the execution time required for a task having the task size of 48 KB is about 149 microseconds, the execution time required for a task having the task size of 64 KB is about 187 microseconds, and the execution time required for a task having the task size of 80 KB is about 226 microseconds.

Threshold execution time T can be determined to be 180 microseconds according to the respective task sizes of the group of tasks and the required execution time. According to the threshold execution time T, the group of tasks described above may be allocated as shown in FIG. 5. The execution time required for the tasks having the task sizes of 32 KB and 48 KB is less than the threshold execution time T, and therefore, the tasks may be allocated to an accelerator resource 110-2. The execution time required for the tasks having the task sizes of 64 KB and 80 KB is larger than the threshold execution time T, and therefore, the tasks may be allocated to an accelerator resource 110-N.

It should be understood that although the threshold execution time T shown in FIG. 5 is determined to be 180 microseconds, in this example, the threshold execution time T may also be determined to be any length of time between 149 microseconds (i.e., the execution time required for the task size of 48 KB) and 187 microseconds (i.e., the execution time required for the task size of 64 KB).

Through the above allocation, the total task size allocated to the accelerator resource 110-2 is 32 KB+32 KB+32 KB+48 KB=144K. The total task size allocated to the accelerator resource 110-N is 80 KB+64 KB=144 KB. Therefore, through such allocation, the total task sizes respectively allocated to the accelerator resource 110-2 and the accelerator resource 110-N are balanced. This balanced allocation can prevent a certain accelerator resource 110 from being too busy and causing a failure. Furthermore, the execution time required for the tasks allocated to the accelerator resource 110-2 is close to that required for the tasks allocated to the accelerator resource 110-N, so that the polling interval can be easily determined for them in following steps.

It should be understood that for ease of illustration, only a simple example of the group of tasks including only 6 tasks is shown in the example of FIG. 5. In practical application, a group of tasks belonging to the same task type may include more or fewer tasks, and the group of tasks may also include more or fewer kinds of task sizes.

Additionally or alternatively, for some certain task types, such as the SHA task type, different task sizes have small difference in required execution time. In this case, the polling interval may be determined according to the task type. For example, the execution time required for the tasks belonging to the SHA task type is about 17 microseconds. The polling interval for an accelerator resource, for example the accelerator resource 110-1 in the example of FIG. 4, to which tasks belonging to the SHA task type are allocated may be set to a length of time close to 17 microseconds, such as 20 microseconds.

Additionally or alternatively, in some embodiments, the execution time required for each task may also be collectively determined according to both an execution level and a task size of the task. For example, an association among the required execution time, the execution level, and the task size of each task in the group of tasks is pre-stored in the look-up table. The look-up table may be derived from historical execution information of the storage system 100, or may be derived from data of a plurality of experiments. In some embodiments, the look-up table may also be provided by a producer of the accelerator resource 110. Table 1 below illustrates an example look-up table according to some embodiments of the present disclosure.

task sizes, execution levels, and execution time for tasks of the SHA task type may have a look-up table similar to Table 1.

The threshold execution time T may be determined according to the task size, the execution level, and the corresponding required execution time of each task in the group of tasks. In accordance with the threshold execution time T, the group of tasks may be allocated to two accelerator resources of the plurality of accelerator resources 110 to ensure that the task sizes of the two accelerator resources are substantially balanced. It should be understood that in some embodiments, more than one threshold execution time may also be determined to allocate the group of tasks to more than two accelerator resources.

Figure 6:
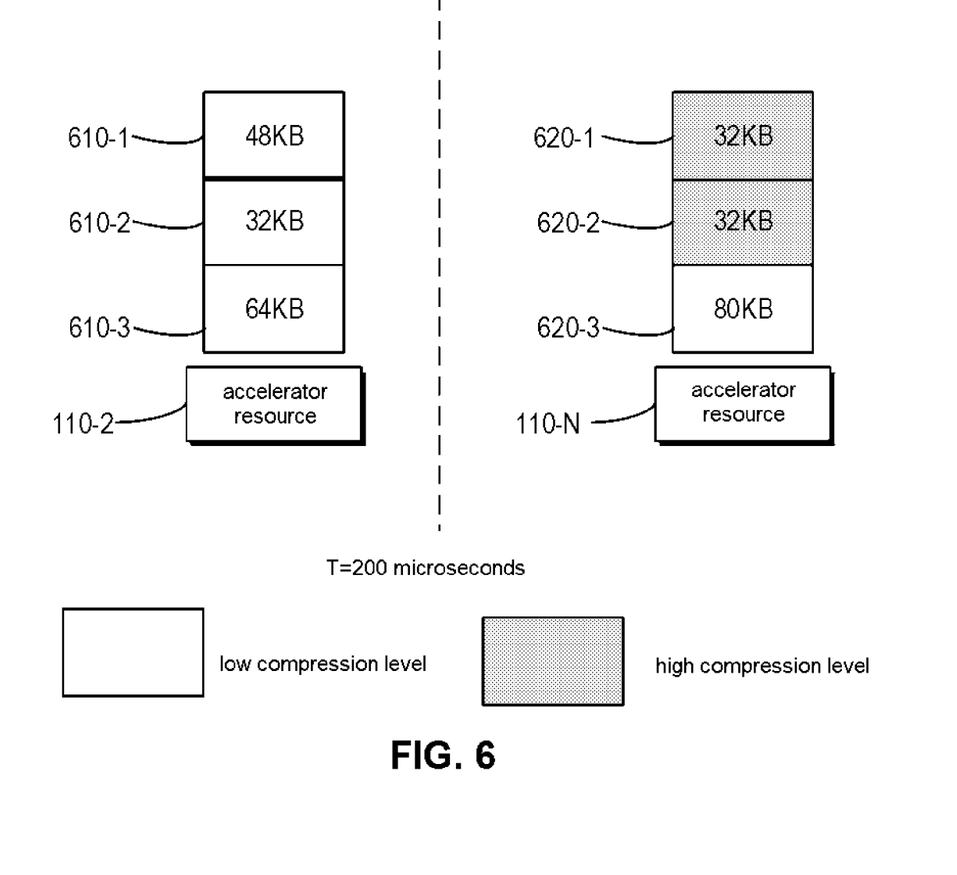
FIG. 6 illustrates still another schematic diagram of task allocation according to some embodiments of the present disclosure.

FIG. 6 illustrates a schematic diagram of allocating a group of tasks according to respective task sizes and execution levels in accordance with an embodiment of the present disclosure. In the example of FIG. 6, taking compression tasks as an example, a group of compression tasks includes a task 610-2 having a task size of 32 KB, a task 610-1 having a task size of 48 KB, a task 610-3 having a task size of 64 KB, and a task 620-3 having a task size of 80 KB with a low compression level (i.e., the execution level 1 in Table 1). The group of compression tasks also includes tasks 620-1 and 620-2 having a task size of 32 KB with a high compression level (i.e., the execution level 4 in Table 1).

According to the look-up table 1, the execution time required for each task in the group of tasks can be determined. For example, the execution time required for the task 610-2 is 109 microseconds (μs), and the execution time required for the task 620-1 is 274 μs.

The threshold execution time T may be determined to be 200 microseconds according to the task size, execution level, and required execution time of each task in the group of tasks. Compared to the example shown in FIG. 5, the high-compression-level tasks 620-1 and 620-2 shown in FIG. 6 require longer execution time than the low-compression-level tasks 610-2 having the same task size. Therefore,

TABLE 1

Example Look-up Table

|  | 4 KB | 8 KB | 16 KB | 32 KB | 48 KB |
|---|---|---|---|---|---|
| execution level 1 | 29 microseconds | 40 microseconds | 67 microseconds | 109 microseconds | 149 microseconds |
| execution level 2 | 36 microseconds | 54 microseconds | 105 microseconds | 176 microseconds | 232 microseconds |
| execution level 3 | 39 microseconds | 63 microseconds | 130 microseconds | 216 microseconds | 284 microseconds |
| execution level 4 | 43 microseconds | 77 microseconds | 167 microseconds | 274 microseconds | 359 microseconds |

|  | 64 KB | 80 KB | 96 KB | 128 KB |
|---|---|---|---|---|
| execution level 1 | 187 microseconds | 226 microseconds | 263 microseconds | 337 microseconds |
| execution level 2 | 291 microseconds | 370 microseconds | 449 microseconds | 604 microseconds |
| execution level 3 | 354 microseconds | 462 microseconds | 572 microseconds | 796 microseconds |
| execution level 4 | 441 microseconds | 611 microseconds | 781 microseconds | 1127 microseconds |

In Table 1 above, taking compression tasks as an example, the execution time required for tasks of different task sizes at different execution levels (also referred to as compression levels) are illustrated. It should be understood that Table 1 is merely illustrative and not limiting. In addition to the task sizes shown in Table 1, there may be other task sizes. In addition to the execution levels shown in Table 1, there may be other execution levels. Similar look-up tables may also be used for other task types, such as the SHA task type. For example, the SHA task type using an SHA1 algorithm and the SHA task type using an SHA256 algorithm may correspond to different execution levels of the SHA task type. The compared with the example of FIG. 5, the threshold time T determined in the example of FIG. 6 is longer.

According to the threshold execution time T, the group of tasks described above may be allocated as shown in FIG. 6. The execution time required for the low-compression-level tasks having the task sizes of 32 KB, 48 KB, and 64 KB is less than the threshold execution time T, and therefore the tasks may be allocated to the accelerator resource 110-2. The execution time required for the low-compression-level task having the task size of 80 KB is greater than the threshold execution time T, and therefore the task may be allocated to the accelerator resource 110-N. The execution time required for the high-compression-level task having the task size of 32 KB is greater than the threshold execution time T, and therefore the task may be allocated to the accelerator resource 110-N.

Through the above allocation, the total task size allocated to the accelerator resource 110-2 is 48 KB+32 KB+64 KB=144 KB. The total task size allocated to the accelerator resource 110-N is 32 KB+32 KB+80 KB=144 KB. Therefore, through such allocation, the total task sizes respectively allocated to the accelerator resource 110-2 and the accelerator resource 110-N are balanced. This balanced allocation can prevent a certain accelerator resource 110 from being too busy and causing a failure. Furthermore, the execution time required for the tasks allocated to the accelerator resource 110-2 is close to that required for the tasks allocated to the accelerator resource 110-N, so that the polling interval can be easily determined for them in following steps.

It should be understood that for ease of illustration, only a simple example of the group of tasks including only 6 tasks is shown in the example of FIG. 6. In practical application, a group of tasks belonging to the same task type may include more or fewer tasks, and the group of tasks may also include more or fewer kinds of task sizes, or more or fewer execution levels.

An example of allocating the group of tasks belonging to the same task type according to the task size is shown above with reference to FIG. 5. An example of allocating the group of tasks belonging to the same task type according to both the task size and the execution level is shown with reference to FIG. 6. It should be understood that in some embodiments, the group of tasks belonging to the same task type may also be allocated according to the execution levels only. It should be understood that in some embodiments, in addition to the task size and the execution level described above, other factors affecting the execution time of the task, such as a data pattern and data compressibility, may also be considered.

Additionally or alternatively, in some embodiments, at least part of the plurality of tasks may be reallocated if an imbalance in task processing at the plurality of accelerator resources 110 is determined. For example, if the imbalance in task processing between the accelerator resource 110-2 and the accelerator resource 110-N is determined, the tasks at the accelerator resource 110-2 and accelerator resource 110-N may be reallocated by redetermining the threshold execution time T. Taking the example of FIG. 5 as an example, a current threshold execution time T is 180 microseconds, and it is found that the accelerator resource 110-N has too many tasks during execution. In this case, the threshold execution time T may be gradually increased, for example, by 5 microseconds each time, and whether the tasks between the accelerator resource 110-2 and the accelerator resource 110-N are balanced is observed.

In this way, at least part of the plurality of tasks may be reallocated in a case where an imbalance in task processing is determined. Therefore, the tasks of the various accelerator resources 110 in the storage system 100 may be balanced.

It should be understood that although the process of allocating the tasks of the same task type is shown above with reference to FIG. 5 and FIG. 6 by taking the tasks of the compression task type as an example, for the tasks of other task types, a similar process can be performed for allocation.

Returning to FIG. 3, at 320, for a first accelerator resource of the plurality of accelerator resources 110, a first polling interval is determined based on an average task size of a first group of tasks allocated to the first accelerator resource. For example, taking the example of FIG. 5 as an example, for the accelerator resource 110-2, the first polling interval is determined based on the average task size of the tasks 510-1, 510-2, 510-3, and 510-4 allocated to the accelerator resource 110-2.

In the example of FIG. 5, the accelerator resource 110-2 has the average task size of 36 KB, which correspondingly requires execution time between 109 microseconds (i.e., execution time required for 32 KB) and 149 microseconds (i.e., execution time required for 48 KB). Therefore, the first polling interval may be determined to be a length of time between 109 microseconds and 149 microseconds, such as 120 microseconds.

In some embodiments, the first polling interval may also be determined based on the execution time required for each task in the first group of tasks allocated to the first accelerator resource. For example, taking FIG. 5 as an example, the first polling interval may be determined by calculating the average execution time, or weighted average execution time, of the execution time respectively required by the tasks in a group of tasks allocated to the accelerator resource 110-2. Taking FIG. 5 as an example, the average execution time of the execution time required for the tasks 510-1, 510-2, 510-3, and 510-4 allocated to the accelerator resource 110-2 may be calculated as (109+109+109+149) microseconds/4=119 microseconds. It should be understood that for the example of FIG. 6, the polling interval may also be determined by a similar method.

It should be understood that although the process of determining the polling interval is described only with the accelerator resource 110-2 as an example, a similar process may be performed to determine the polling intervals respectively for other accelerator resources 110 in the storage system 100.

In such a manner, the polling interval can be determined as time close to the average execution time of a group of tasks allocated to the accelerator resource 110. Therefore, it is possible to avoid an unnecessary polling operation due to an excessively short polling interval, and meanwhile avoid an unnecessary processing delay due to an excessively long polling interval.

Returning to FIG. 3, at 330, the execution of the first group of tasks at the first accelerator resource is scheduled at the first polling interval. For example, taking FIG. 5 as an example, the task 510 may be scheduled at a polling interval of, for example, 119 microseconds.

In some embodiments, it may be determined whether the accelerator resource 110-2 has completed the task 510-1 in the first group of tasks 510 at the first polling interval (such as 119 microseconds), If it is determined that the accelerator resource 110-2 has completed the task 510-1, an execution result of the completed task 510-1 can be returned to each device or node or program, to which the task is issued, of the storage system 100. Furthermore, the task 510-1 may be removed from the accelerator resource 110-2. Additionally or alternatively, a next task in the tasks 510 that is not executed, for example, the task 510-2, may also be executed by the accelerator resource 110-2.

In some embodiments, it can be constantly determined whether the accelerator resource 110-2 has completed each one of the tasks 510 at the first polling interval, the completed task is removed in turn, and the next task is executed. It should be understood that for other resources of the accelerator resources 110, a similar process may be performed to schedule execution of the group of tasks allocated to the accelerator resource 110 at the accelerator resource 110 at the determined respective polling interval.

The examples of task allocation according to some embodiments of the present disclosure are shown above with reference to FIG. 1 and FIG. 3 to FIG. 6. According to the solution of the present disclosure, different tasks can be allocated to a plurality of accelerator resources according to the task types, and therefore appropriate polling intervals can be determined for the plurality of accelerator resources correspondingly.

In addition, in accordance with the solution disclosed by the present disclosure, various tasks can be further allocated to different accelerator resources according to the execution time respectively required by each group of tasks belonging to the same task type. In this way, the polling interval can be further determined to be close to the execution time required for each task allocated to the accelerator resource. Therefore, it is not only possible to ensure a balance of the tasks among the various accelerator resources, but also possible to determine to perform poll scheduling on the tasks at each accelerator resource at an optimized polling interval, thereby further improving the overall performance of the storage system.

Figure 7:
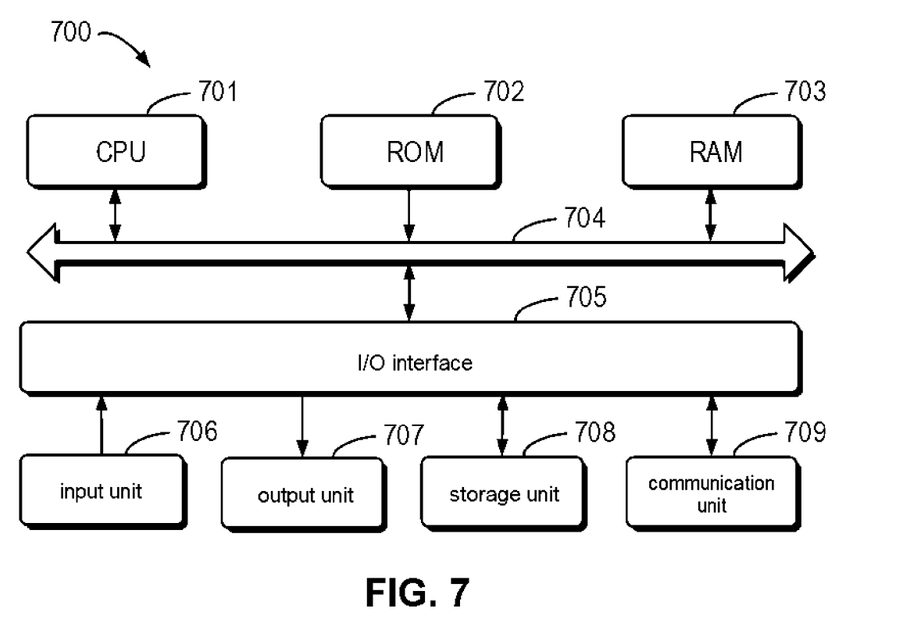
FIG. 7 illustrates a schematic block diagram of an example device that can be used to implement embodiments of the present disclosure.

FIG. 7 illustrates a schematic block diagram of an example device 700 that can be used to implement the embodiments of the present disclosure. For example, the storage system 100 as shown in FIG. 1 may be implemented by the device 700. As shown in FIG. 7, the device 700 includes a central processing unit (CPU) 701 that may perform various appropriate actions and processing according to computer program instructions stored in a read-only memory (ROM) 702 or computer program instructions loaded from a storage unit 708 to a random access memory (RAM) 703. Various programs and data required for the operation of the device 700 may also be stored in RAM 703. A CPU 701, a ROM 702, and a RAM 703 are connected to one another through a bus 704. An input/output (I/O) interface 705 is also connected to the bus 704.

A plurality of components in the device 700 are connected to the I/O interface 705, including: an input unit 706, such as a keyboard and a mouse; an output unit 707, such as various types of displays and speakers; a storage unit 708, such as a magnetic disk and an optical disc; and a communication unit 709, such as a network card, a modem, and a wireless communication transceiver. The communication unit 709 allows the device 700 to exchange information/data with other devices via a computer network, such as the Internet, and/or various telecommunication networks.

The various processes and processing described above, such as the method 300, may be performed by the processing unit 701. For example, in some embodiments, the method 300 may be implemented as a computer software program that is tangibly included in a machine-readable medium such as the storage unit 708. In some embodiments, part or all of the computer program may be loaded and/or installed to the device 700 via the ROM 702 and/or the communication unit 709. When the computer program is loaded into the RAM 703 and executed by the CPU 701, one or more actions of the method 300 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming language such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

The embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

The invention claimed is:

1. A method for managing a storage system, comprising: based on respective task types of a plurality of tasks to be executed, allocating the plurality of tasks to a plurality of accelerator resources in a storage system for processing, comprising:
   for a group of tasks belonging to a same type in the plurality of tasks, allocating the group of tasks according to both a task size and an execution level for the group of tasks; and
   at least for a first accelerator resource in the plurality of accelerator resources,
      determining a first polling interval based on an average task size of a first group of tasks allocated to the first accelerator resource; and
      scheduling an execution of the first group of tasks at the first accelerator resource at the first polling interval; and
   in response to determining an imbalance in task processing at the plurality of accelerator resources, changing a threshold execution time at the plurality of accelerator resources.

2. The method according to claim 1, wherein allocating the plurality of tasks to the plurality of accelerator resources in the storage system comprises:
   for a group of tasks belonging to the same type in the plurality of tasks, allocating the group of tasks based on execution time required for the group of tasks.

3. The method according to claim 2, wherein the execution time is determined according to at least one of an execution level and a task size of the group of tasks.

4. The method according to claim 3, wherein an association among the execution time, the execution level, and the task size of each task in the group of tasks is pre-stored in a lookup table.

5. The method according to claim 1, further comprising:
   in response to determining the imbalance in task processing at the plurality of accelerator resources, reallocating at least part of the plurality of tasks by changing the threshold execution time.

6. The method according to claim 1, wherein determining the first polling interval comprises:
   determining the first polling interval based on execution time required for each task in the first group of tasks.

7. The method according to claim 1, wherein scheduling the execution of the first group of tasks at the first accelerator resource at the first polling interval comprises:
   determining, at the first polling interval, whether the first accelerator resource has completed a first task in the first group of tasks; and
   under the condition that it is determined that the first accelerator resource has completed the first task,
   removing the completed first task from the first accelerator resource; and
   executing, by the first accelerator resource, a next task in the first group of tasks that is not executed.

8. The method according to claim 1, wherein the plurality of accelerator resources each include a Quick Assist Technology (QAT) card.

9. An electronic device, comprising:
   at least one processor; and
   at least one memory storing computer program instructions, which when executed by the at least one processor, cause the at least one processor to perform actions, the actions comprising:

based on respective task types of a plurality of tasks to be executed, allocating the plurality of tasks to a plurality of accelerator resources in a storage system for processing, comprising:
for a group of tasks belonging to a same type in the plurality of tasks, allocating the group of tasks according to both a task size and an execution level for the group of tasks; and
at least for a first accelerator resource in the plurality of accelerator resources,
determining a first polling interval based on an average task size of a first group of tasks allocated to the first accelerator resource; and
scheduling an execution of the first group of tasks at the first accelerator resource at the first polling interval; and
in response to determining an imbalance in task processing at the plurality of accelerator resources, changing a threshold execution time at the plurality of accelerator resources.

10. The electronic device according to claim 9, wherein allocating the plurality of tasks to the plurality of accelerator resources in the storage system comprises:
for a group of tasks belonging to the same type in the plurality of tasks, allocating the group of tasks based on execution time required for the group of tasks.

11. The electronic device according to claim 10, wherein the execution time is determined according to at least one of an execution level and a task size of the group of tasks.

12. The electronic device according to claim 11, wherein an association among the execution time, the execution level, and the task size of each task in the group of tasks is pre-stored in a lookup table.

13. The electronic device according to claim 9, wherein the actions further comprise:
in response to determining the imbalance in task processing at the plurality of accelerator resources, reallocating at least part of the plurality of tasks by changing the threshold execution time.

14. The electronic device according to claim 9, wherein determining the first polling interval comprises:
determining the first polling interval based on execution time required for each task in the first group of tasks.

15. The electronic device according to claim 9, wherein scheduling the execution of the first group of tasks at the first accelerator resource at the first polling interval comprises:
determining, at the first polling interval, whether the first accelerator resource has completed a first task in the first group of tasks; and
under the condition that it is determined that the first accelerator resource has completed the first task,
removing the completed first task from the first accelerator resource; and
executing, by the first accelerator resource, a next task in the first group of tasks that is not executed.

16. The electronic device according to claim 9, wherein the plurality of accelerator resources each include a Quick Assist Technology (QAT) card.

17. A non-volatile computer-readable medium having machine-executable instructions stored therein, which when executed by a processor, cause the processor to perform actions, the actions comprising:
based on respective task types of a plurality of tasks to be executed, allocating the plurality of tasks to a plurality of accelerator resources in a storage system for processing, comprising:
for a group of tasks belonging to a same type in the plurality of tasks, allocating the group of tasks according to both a task size and an execution level for the group of tasks; and
at least for a first accelerator resource in the plurality of accelerator resources,
determining a first polling interval based on an average task size of a first group of tasks allocated to the first accelerator resource; and
scheduling the execution of the first group of tasks at the first accelerator resource at the first polling interval; and
in response to determining an imbalance in task processing at the plurality of accelerator resources, changing a threshold execution time at the plurality of accelerator resources.

18. The computer-readable medium according to claim 17, wherein allocating the plurality of tasks to the plurality of accelerator resources in the storage system comprises:
for a group of tasks belonging to the same type in the plurality of tasks, allocating the group of tasks based on execution time required for the group of tasks.

19. The computer-readable medium according to claim 18, wherein the execution time is determined according to at least one of an execution level and a task size of the group of tasks.

20. The computer-readable medium according to claim 19, wherein an association among the execution time, the execution level, and the task size of each task in the group of tasks is pre-stored in a lookup table.

* * * * *